US012639876B2

(12) United States Patent
Prozesky

(10) Patent No.: US 12,639,876 B2
(45) Date of Patent: May 26, 2026

(54) GRAPHICAL ANIMATION WITH IMAGE GENERATION ENHANCEMENTS

(71) Applicant: Fusion Holdings Limited, Douglas (IM)

(72) Inventor: David Jason Prozesky, Kwazulu-Natal (ZA)

(73) Assignee: Fusion Holdings Limited, Douglas (IM)

( * ) Notice: Subject to any disclaimer, the term of this patent is extended or adjusted under 35 U.S.C. 154(b) by 198 days.

(21) Appl. No.: 18/787,570

(22) Filed: Jul. 29, 2024

(65) Prior Publication Data

US 2026/0030822 A1     Jan. 29, 2026

(51) Int. Cl.
*G06T 13/40*          (2011.01)
(52) U.S. Cl.
CPC .................................. *G06T 13/40* (2013.01)
(58) Field of Classification Search
CPC .......... G06T 13/40; G06T 15/04; G06T 13/80
See application file for complete search history.

(56) References Cited

U.S. PATENT DOCUMENTS

| | | |
|---|---|---|
| 8,446,414 B2 | 5/2013 | Reville |
| 9,032,307 B2 | 5/2015 | Gerson |
| 10,032,305 B2 | 7/2018 | West |
| 10,796,480 B2 | 10/2020 | Chen |
| 10,888,785 B2 | 1/2021 | Buttner |
| 11,217,006 B2 | 1/2022 | Van Hoff |

| | | | |
|---|---|---|---|
| 11,436,782 B2 | 9/2022 | Macdonald | |
| 2014/0078144 A1 | 3/2014 | Berriman | |
| 2015/0178988 A1 | 6/2015 | Montserrat Mora | |
| 2021/0097752 A1* | 4/2021 | Breitenfeld | G06T 17/20 |
| 2022/0343546 A1* | 10/2022 | Danieau | G06T 9/00 |

FOREIGN PATENT DOCUMENTS

WO          2021155140 A1     8/2021

OTHER PUBLICATIONS

Esoteric Software, Spine: In Depth, downloaded from https://esotericsoftware.com/spine-in-depth, Jul. 22, 2024.

(Continued)

*Primary Examiner* — Yingchun He
(74) *Attorney, Agent, or Firm* — McDonnell Boehnen Hulbert & Berghoff LLP

(57)          ABSTRACT

An implementation may involve: obtaining a plurality of invertible mappings between pixel locations of first avatar parts for a first avatar and pixel locations of the first avatar parts represented as individual images in non-overlapping regions of a first image atlas, wherein the first avatar can be graphically animated by an animation engine based on the first image atlas and the invertible mappings; based on the first avatar and a command, obtaining a second avatar that is commensurate in shape and size to that of the first avatar; and based on inverting the invertible mappings, determining a second image atlas for the second avatar, wherein non-overlapping regions of the second image atlas contain second avatar parts for the second avatar represented as individual images, and wherein the second avatar can be animated by the animation engine based on the second image atlas and the invertible mappings.

20 Claims, 9 Drawing Sheets

600

Obtain a plurality of invertible mappings between pixel locations of first avatar parts for a first avatar and pixel locations of the first avatar parts represented as individual images in non-overlapping regions of a first image atlas, wherein the first avatar can be graphically animated by an animation engine based on the first image atlas and the invertible mappings

602

Based on the first avatar and a command, obtain a second avatar that is commensurate in shape and size to that of the first avatar

604

Based on inverting the invertible mappings, determine a second image atlas for the second avatar, wherein non-overlapping regions of the second image atlas contain second avatar parts for the second avatar represented as individual images, and wherein the second avatar can be animated by the animation engine based on the second image atlas and the invertible mappings

(56) References Cited

OTHER PUBLICATIONS

Unity, Bringing 2D characters to life with sprite rigging—Unite Copenhagen, Oct. 14, 2019, available at https://www.youtube.com/watch?v=vap04-Py9QM.

Extended European Search Report, EP Patent Application 25189920.9, dated Oct. 31, 2025.

Grigorev et al., A Generative Model of Fullbody Human Avatars, IEEE/CVF Conference on Computer Vision and Pattern Recognition (CVPR), 2021.

Hauswiesner et al., Image-Based Clothes Transfer, IEEE International Symposium on Mixed and Augmented Reality 2011 Science and Technology Proceedings, Oct. 2011.

* cited by examiner

400

402 avatar1.png
  size: 1024, 256
  filter: Linear, Linear
  scale: 0.5
right-shin
  bounds: 7, 11, 32, 79
torso
  bounds: 44, 12, 41, 78
left-shin
  bounds: 88, 14, 32, 75
goggles
  bounds: 124, 18, 111, 71
head
  bounds: 6, 92, 119, 130

410

```
{
  "skeleton": {
    "hash": "SmUDxzck41o",
    "spine": "4.1.23-beta",
    "x": -221.27,
    "y": -8.57,
    "width": 470.72,
    "height": 731.57,
    "images": "../images/",
    "audio": ""
  },
  "bones": [
    {
      "name": "root"
    },
    {
      "name": "hip",
      "parent": "root",
      "y": 247.47
    },
    {
      "name": "torso",
      "parent": "hip",
      "length": 127.56,
      "rotation": 103.82,
      "x": -1.62,
      "y": 4.9,
      "color": "e0da19ff"
    },
    {
      "name": "front-upper-arm",
      "parent": "torso",
      "length": 69.45,
      "rotation": 168.38,
      "x": 103.76,
      "y": 19.33,
      "color": "00ff04ff"
    }
  ]
}
```

412

422

430

Reverse Transformation

432

434 avatar2.png
  size: 1024, 256
  filter: Linear, Linear
  scale: 0.5
right-shin-cowboy
  bounds: 7, 11, 32, 79
torso-cowboy
  bounds: 44, 12, 41, 78
left-shin-cowboy
  bounds: 88, 14, 32, 75
goggles-cowboy
  bounds: 124, 18, 111, 71
head-cowboy
  bounds: 6, 92, 119, 130

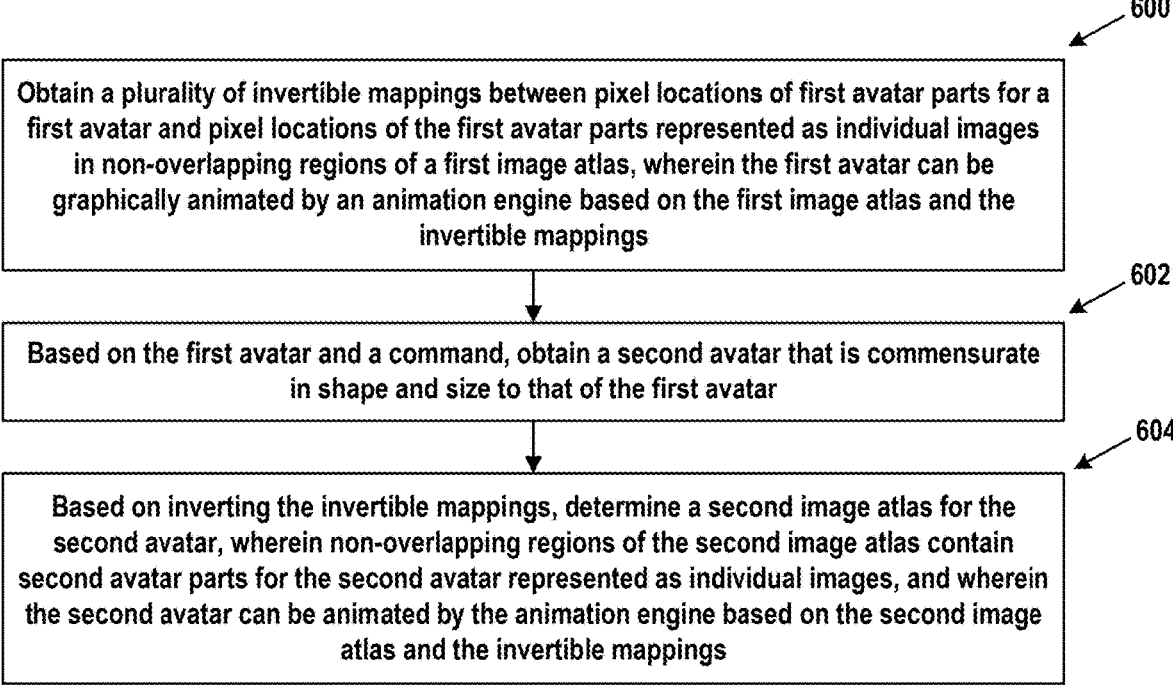

600

Obtain a plurality of invertible mappings between pixel locations of first avatar parts for a first avatar and pixel locations of the first avatar parts represented as individual images in non-overlapping regions of a first image atlas, wherein the first avatar can be graphically animated by an animation engine based on the first image atlas and the invertible mappings

602

Based on the first avatar and a command, obtain a second avatar that is commensurate in shape and size to that of the first avatar

604

Based on inverting the invertible mappings, determine a second image atlas for the second avatar, wherein non-overlapping regions of the second image atlas contain second avatar parts for the second avatar represented as individual images, and wherein the second avatar can be animated by the animation engine based on the second image atlas and the invertible mappings

FIG. 6

GRAPHICAL ANIMATION WITH IMAGE GENERATION ENHANCEMENTS

BACKGROUND

An avatar in a software application is a graphical representation of a character or entity that can be controlled by a user and/or act at least somewhat independently of the user. Avatars can range from simple two-dimensional (2D) icons to highly detailed three-dimensional (3D) models, depending on the software application's graphical complexity and requirements. They can be of various sizes and shapes, and may feature cartoon-like or realistic textures. Animation allows avatars to simulate simple and/or complex motions that respond to user input or their virtual environment. To produce these animations, programmatic methods transform a collection of static images representing parts of the avatar into the simulated motion.

Current 2D and some 3D animation modeling often involve image atlases, also known as sprite sheets. Image atlases are image files that contain grids of smaller sub-images or frames, each representing different stages of one or more animation sequences for an avatar or part(s) of the avatar. Animators design and draw each frame to ensure consistency in the avatar's appearance and positioning. These frames are then compiled into the image atlases. In the animation engine of the software application, a script or animation controller references specific coordinates within the image atlas to display the appropriate frame at the right time, with the goal of creating smooth and believable movement for the avatar.

Nonetheless, there are drawbacks to this approach. In particular, animations of avatars are non-trivial to develop, requiring realization of the avatar design, splitting the avatar apart into frames for the image atlas, and the ability to create fluid, believable, and compelling programmatic animations. In particular, current techniques often fail to reuse the designs, frames, and/or image atlases of previous-implemented avatars thus wasting computing resources (e.g., processing, memory, and/or network capacity).

SUMMARY

The embodiments herein provide technical improvements to these and potentially other technical problems by facilitating the generation of new avatars based on images of existing avatars. Inverted mappings between avatar parts in existing avatars and their respective images atlases can be used to define image atlases for the new avatars. Then, these new avatars can be animated, possibly with the same animation sequences of the existing avatars. In doing so, redundant steps in the animation process can be eliminated, thereby reducing usage of computing resources.

Accordingly, a first example embodiment may involve obtaining a plurality of invertible mappings between pixel locations of first avatar parts for a first avatar and pixel locations of the first avatar parts represented as individual images in non-overlapping regions of a first image atlas, wherein the first avatar can be graphically animated by an animation engine based on the first image atlas and the invertible mappings; based on the first avatar and a command, obtaining a second avatar that is commensurate in shape and size to that of the first avatar; and based on inverting the invertible mappings, determining a second image atlas for the second avatar, wherein non-overlapping regions of the second image atlas contain second avatar parts for the second avatar represented as individual images, and wherein the second avatar can be animated by the animation engine based on the second image atlas and the invertible mappings.

Some implementations may involve animating, by the animation engine, the second avatar, wherein the animation engine applies the plurality of invertible mappings to the second image atlas based on an animation sequence for the first avatar.

In some implementations, the second avatar is in a common pose as that of the first avatar.

In some implementations, the first avatar is in a first pose, wherein the second avatar is in a second pose derived from the first pose.

In some implementations, the invertible mappings comprise linear translations of horizontal and vertical coordinates of the first avatar parts.

In some implementations, the invertible mappings comprise rotation for at least some of the first avatar parts.

In some implementations, the invertible mappings associate at least some of the first avatar parts to joints of an animation skeleton of the first avatar.

In some implementations, the second avatar comprises a reskinned version of the first avatar.

In some implementations, the first avatar parts and the second avatar parts comprise limbs, clothing, or accessories.

In some implementations, the first avatar is a two-dimensional representation of a first object, and the second avatar is a two-dimensional representation of a second object.

In some implementations, the non-overlapping regions respectively comprise two-dimensional bounding boxes that define quadrilaterals.

In some implementations, obtaining the second avatar further comprises: providing, to an image generation model, an image representation of the first avatar and the command, wherein the image representation of the first avatar comprises a frame of an animation of the first avatar; and receiving, from the image generation model, an image representation of the second avatar.

A second example embodiment may involve a non-transitory computer-readable medium, having stored thereon program instructions that, upon execution by a computing system, cause the computing system to perform operations in accordance with of any previous embodiment.

A third example embodiment may involve a computing system comprising: one or more processors; memory; and program instructions, stored in the memory, that upon execution by the one or more processors cause the computing system to perform the operations of any previous embodiment.

In a fourth example embodiment, a computing system may include various means for carrying out each of the operations of any previous embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 is a flow chart, in accordance with example embodiments.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Herein, a "software application" may be any structured set of computer-executable instructions that can perform a specific function or a set of related functions. This encompasses programs that operate in various computing environments, including but not limited to standalone desktop applications, mobile applications, web-based applications, embedded systems software, cloud-based services, distributed computing applications, and operating systems. Software applications may involve the processing, manipulation, and management of data, control of hardware devices, execution of various algorithms, provisioning of user interfaces for interaction, and communication with other software applications or services. The term is inclusive of software that performs an array of functions, whether pre-installed, downloaded, accessed remotely, or delivered as a service. This definition is intended to cover a broad range of software implementations, architectures, and platforms, recognizing the evolving nature of technology and software development practices.

I. Example Computing Devices and Environments

Figure 1:
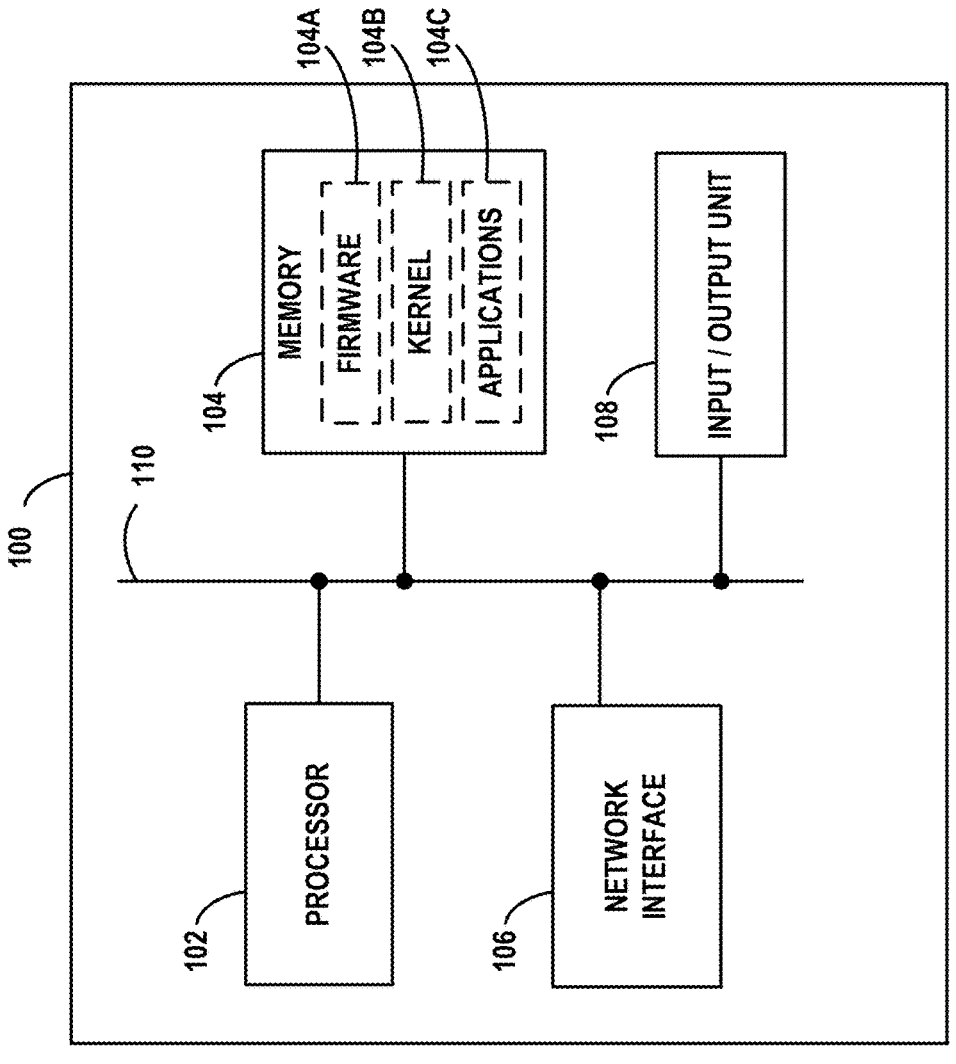
FIG. 1 illustrates a schematic drawing of a computing device, in accordance with example embodiments.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a graphical processing unit (GPU), a digital signal processor (DSP), a network processor, an encryption processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently used instructions and data.

GPUs, in particular, have grown in importance. They include specialized circuitry designed to perform rapid mathematical calculations for rendering graphics, processing large datasets, and supporting machine learning. A GPU typically consists of hundreds or thousands of small cores that operate simultaneously, facilitating the decomposition of tasks into smaller, more manageable pieces that are processed in parallel. This parallelism allows GPUs to be significantly faster than traditional CPUs for certain types of calculations.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory. Herein, any non-volatile memory may be referred to as persistent storage.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet local-area media, such as coaxial cables or power lines, or over wide-area media, such as fiber-optic connections (e.g., Synchronous Optical Network and Synchronous Digital Hierarchy) or other technologies. Network interface 106 may additionally take the form of one or more wireless interfaces, such as IEEE 802.11 (Wifi), Bluetooth, global positioning system (GPS), or a wide-area wireless interface (e.g., using 4G or 5G cellular networks). However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, Bluetooth, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed as a cluster of server devices. The exact physical location, connectivity, and configuration of these computing devices may be unknown and/or unimportant to client devices. Accordingly, the computing devices may be referred to as "cloud-based" devices that may be housed at various remote data center locations.

Figure 2:
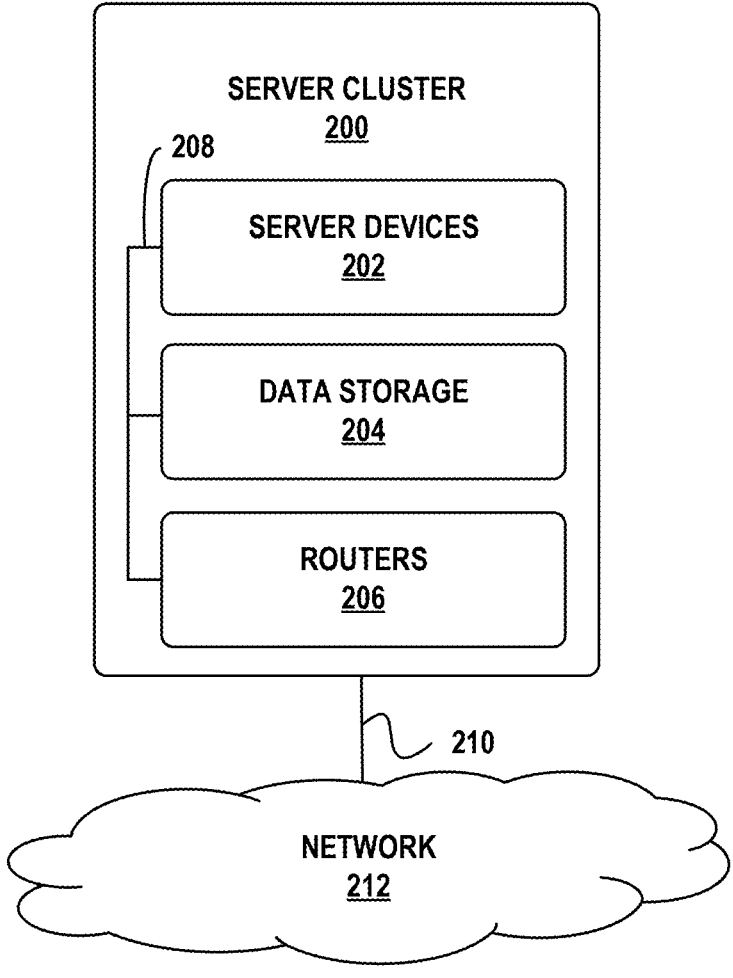
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed between one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the HyperText Markup Language (HTML), the extensible Markup Language (XML), Cascading Style Sheets (CSS), and/or JavaScript Object Notation (JSON), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages. Alternatively or additionally, Java may be used to facilitate generation of web pages and/or to provide web application functionality.

Figures 3A, 3B:
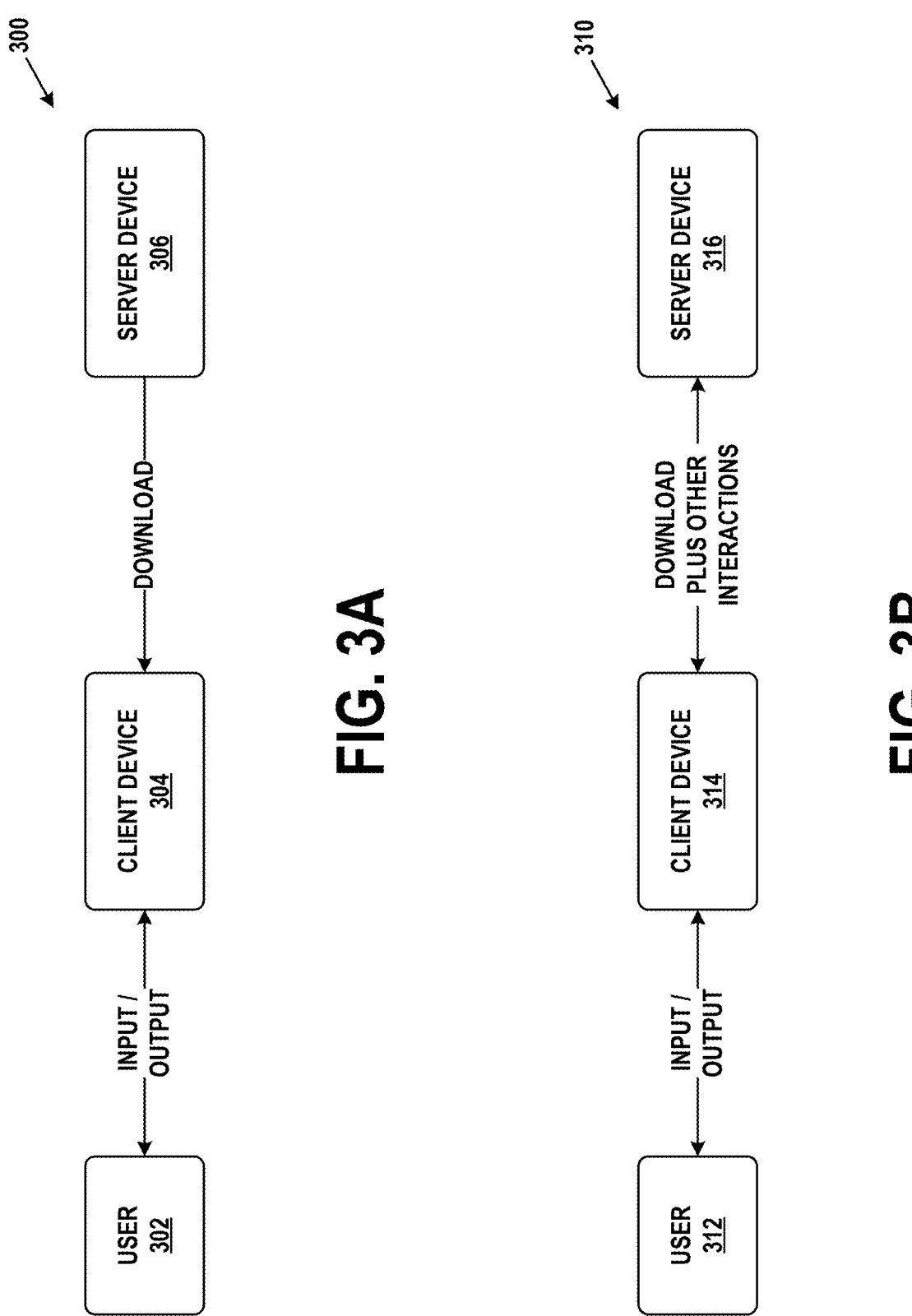
FIGS. 3A and 3B depict client/server arrangements for operation of a software application, in accordance with example embodiments.

FIGS. 3A and 3B depict various types of client/server computing environments in which software applications can be deployed. As discussed below, these environments are just some examples and other environments are possible.

FIG. 3A illustrates computing environment 300 in which user 302 downloads a software application to client device 304 from server device 306. Once downloaded, the software application operates entirely on client device 304 without further need for connectivity to server device 306 (aside from any occasional updates to the software application). Here, client device 304 may be a computing device collocated with user 302, such as a laptop computing, desktop computer, tablet device, or mobile phone. Thus, client device 304 may be embodied by computing device 100. Server device 306 may be single server device or a cluster as embodied by server cluster 200.

User 302 interacts with the software application via client device 304, providing input to client device 304 and receiving output from client device 304. The input provided by user 302 may include any combination of keyboard, mouse, touchscreen, or controller (e.g., joystick) events, audio received by a microphone, images received by a camera or scanner, and/or input from biometric devices, wearable devices, or other sensors. The output provided by client device 304 may include text, images, or videos (e.g., live-computed animations or pre-recorded sequences), audio from speakers (including headphones or earbuds), signals from lights or other visual indicators, tactile feedback from haptic devices, and/or virtual reality/augmented reality output.

As noted, client device 304 may download the software application from server device 306. Then client device 304 may unpack and install the software application. Once installed, client device 304 needs minimal interaction or no further interaction with server device 306. In other words, the software application can operate in a standalone fashion. Nonetheless, client device 304 may communicate with server device 306 from time to time to determine if there are updates to the software application available for download, or to save some representation of the state of software application.

In this computing environment, it is assumed that the software application includes or has access to an animation engine. Such an animation engine handles the creation, management, and execution of animations within the software application. It may create, store, and organize various animation assets, such as avatars, avatar parts, frames, image atlases, pre-defined movement sequences, object transformations, and environmental effects. For avatar animation, an animation engine may employ skeletal animation, where avatar movement is driven by an underlying skeleton or rig, enabling more complex and lifelike animations. The animation engine may also support inverse kinematics to position an avatar's limbs in a natural and realistic manner during interactions with its virtual environment, such as reaching for objects or placing feet on uneven surfaces. The animation engine may be integrated with a physics engine, so that animations respond as expected to physical interactions, like collisions and gravity.

FIG. 3B illustrates computing environment 310 in which user 312 downloads a software application to client device 314 from server device 316. Once downloaded, the software application operates on client device 314 but relies on server device 306 for certain functionality during operation. Here, the software application may be considered to be split into client and server components, each with complimentary but largely different functionality. Thus, the animation engine may exist on client device 314, server device 316, or have its functionality distributed between these two devices.

Like client device 304, client device 314 may be a computing device collocated with user 312, such as a laptop computing, desktop computer, tablet device, or mobile phone. Thus, client device 314 may be embodied by computing device 100. Server device 316 may be single server device or a cluster as embodied by server cluster 200.

User 312 interacts with the software application via client device 314, providing input to client device 314 and receiving output from client device 314. This interaction may be similar to that which was described for client device 304. But unlike client device 304, client device 314 also interacts with server device 316. This client/server interaction may be triggered by client device 314 interacting with user 312 (e.g., to obtain information from server device 316 that was requested by user 312) or may occur asynchronously to such interactions. For example, client device 314 may receive input from user 312 and transmit information (e.g., commands and/or state updates) relating to the software application to server device 316 based on this input. Server device 316 may transmit information (e.g., commands and/or state updates) relating to the software application to client device 314 either responsively to receiving information from client device 314 or asynchronous to such interactions.

Like client device 304, client device 314 may download the software application from server device 316. Then client device 314 may unpack and install the software application. Once installed, client device 314 may require connectivity to server device 316 to operate (or at least to operate with a full set of features). Client device 314 may also communicate with server device 316 from time to time to determine if there are updates to the software application available for download, or to save some representation of the state of software application. In some cases, server device 316 may represent separate physical or virtual servers for the downloading of the software application (e.g., "app store" servers) and operation of the software application (e.g., "runtime" servers).

As noted, FIGS. 3A and 3B illustrate just some possible environments in which the embodiments herein may be deployed. Other environments include peer-to-peer (P2P) environments (no dedicated server devices, instead each client device interacts directly with other client devices), cloud-based environments (the software application executes on server devices rather than the client device, and the video output is streamed to the client device), or hybrid environments that combine various aspects of any of the environments described above or other environments.

II. Example Animations

Traditional 2D animation typically features sets of hand-drawn and/or computer-rendered images of backgrounds and objects, collectively referred to as frames. Sequences of these frames are assembled to create animations. The frame rates of animations can vary, but are typically between 12 and 24 frames per second (FPS), though a higher frame rate can be used to improve how smooth the animation appears. The images may be developed one frame at a time (frame-by-frame) with minor variations therebetween to create the illusion of movement when animated.

Modern 2D animation builds upon this framework using a variety of similar techniques while taking advantage of computer software and hardware to improve efficiency. 2D animation of an object typically begins with the creation of an image atlas, also known as a sprite sheet. An image atlas may include a compilation of an object in a variety of poses with each pose representing a single frame of animation. The frames can be programmatically assembled to create the illusion of movement just like traditional 2D animation. Such an animation sequence may represent various movements of the avatar, such as walking, running, climbing, interacting with objects, changing their facial expression, and so on.

The frames in the image atlas are typically organized using a grid-like structure that assigns unique slots (e.g., rectangular, quadrilaterals, or other polygonal bounding boxes defined by their respective corners or vertices) to each frame. Adjacent slots in the grid need not represent each frame of a given animation in sequence. For example, the frames found at two adjacent slots do not necessarily follow one another sequentially when the object is animated. The slots may also be labeled to represent what part of the animation is within the frame. Thus, a frame that contains a default standing pose of an avatar may be labeled as "standing." The number of unique frames contained in the image atlas is typically based on the frame rate (i.e., the higher the frame rate, the more distinct poses are needed to make the animation appear smooth).

The animation software can generate animations by referencing, in a programmed sequence, the slots and/or label of the specific frames located in the image atlas. The animation software may first load the image atlas into memory and parse it or an accompanying set of metadata to determine the dimensions and coordinates of each slot. Once the slots are identified, the animation software uses an animation loop to update the displayed frame at a set interval, defined by the desired frame rate. During each iteration of the loop, the software calculates the current frame based on the elapsed time and displays the appropriate part of the image atlas.

In doing so, a rendering engine of the animation software may be responsible for drawing the correct portion of the image atlas. This is typically done using a process called texture mapping, where the animation software maps the coordinates of the current frame to the corresponding position on the display. By changing the coordinates being rendered at each time step, the animation software creates the illusion of movement. Additionally, animation software may support interpolation techniques and keyframe animation to produce smoother transitions and more complex movements.

Figure 4A:
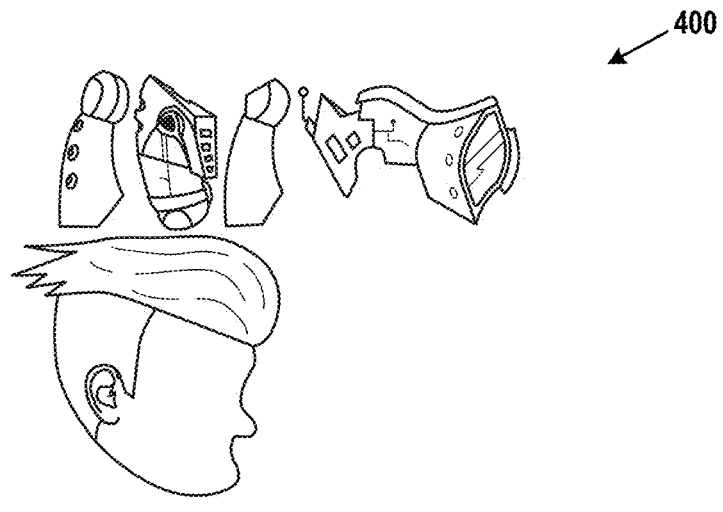
FIGS. 4A and 4B depict an example animation framework based on an image atlas, in accordance with example embodiments.

As an alternative to a detailed image atlas, the animation software may instead utilize a simplified image atlas, as illustrated by FIG. 4A. As an example, simplified image atlas 400 stores the parts of the objects that will be animated within the frames rather than the complete objects (e.g. a frame of a standing humanoid avatar may be broken up into separate smaller frames for each of the avatar's arms, legs, head, etc.). The top row of simplified image atlas 400 includes, from left to right, the avatar's right shin, torso, left shin, and goggles. The bottom row of simplified image atlas 400 includes the avatar's head.

Each of these parts of the avatar in simplified image atlas 400 may be placed within a bounding box, and each of the bounding boxes can be specified by a definitions file 402 in a textual form, though other forms could be used. Further, definitions file 402 may be a complete file, part of a file, or entries in a database for example.

Definitions file 402 first specifies the image atlas for which the bounding boxes are being defined (e.g. avatar1.png) and the pixel dimensions of the image atlas (e.g. size: 1024, 256). Here, the pixel coordinates (x, y) and (x, y, w, h) designate pixel locations and/or pixel distances in the horizontal and vertical dimensions, respectively. The size of the image atlas may be greater than the total size of the assets within the file to allow for additional assets to be added at a later time. Definitions file 402 may also specify the scale of the image atlas, a preferred image filter to apply during animation, and other possible settings that influence how the file is later loaded and/or processed by the animation software. Definitions file 402 may further specify bounding boxes for each part of the avatar (e.g., the left shin, torso, right shin, googles, and head).

Simplified image atlas 400 and definitions file 402 contain only an excerpt of a full image atlas for purposes of illustration. A full image atlas and a full definitions file may contain more avatar parts and their bounding box coordinates, respectively. Further, definitions file 402 may also include additional metadata such as an index which allows for multiple bounding boxes to share a label (e.g. right-shin) so long as they have different indexes, among other options.

Definitions file 402 uses a first method of defining the bounding boxes in which a bounding box is defined as "bounds: x, y, w, h." Using this method, (x, y) are the horizontal and vertical pixel coordinates of the top, left pixel of the bounding box, w is the width of the bounding box as measured from x, and h is the height of the bounding box as measured from y. As an example, the right shin in image atlas 400 (labeled as "right-shin") has a bounding box specified by "bounds: 7, 11, 32, 79". This means that the bounding box starts at pixel point (7, 11) in simplified image atlas 400, which corresponds to the top left corner of the bounding box, and covers an area 32 pixels wide by 79 pixels in height. The bottom right corner is at (39, 90), values of which are the sums of x+w and y+h, respectively.

The bounding boxes of avatar parts may be defined to avoid any overlap between bounding boxes. For example, bounding box of the right shin covers the area within in simplified image atlas 400 from the starting coordinates (7, 11) to an opposite corner of the bounding box with coordinates (39, 90). The torso, which is adjacent to the right shin, has a left most pixel at 44 to avoid any overlap. The head, which is on the row below the right shin, has a top most pixel of 92. All other avatar parts are positioned at similarly disjoint sets of coordinates. Thus, the right shin does not overlap with any of the other avatar parts in simplified image atlas 400.

In a second example of how the bounding box may be defined, the definitions file 402 may utilize a four corners format, wherein the bounds specify each of the four corners of the box that encompasses an avatar part. For example, a definitions file that utilizes the four corners method for the right shin might define its bounds as: (7, 11), (39, 11), (7, 90), and (39, 90). In this example (7,11) are the coordinates of the top left corner of the bounding box, (39,11) are the coordinates of the top right corner of the bounding box, (7, 90) are the coordinates of the bottom left corner of the bounding box, and (39, 90) are the coordinates of the bottom right corner of the bounding box. This method may be preferable in cases where the bounding box is not rectangular, and thus needs to be more specifically defined.

In a third example, a definitions file may utilize an opposite corners format, where the bounds specify two opposite corners of the bounding box (e.g. top left and bottom right, or bottom left and top right). For example, a definitions file that utilizes the opposite corners method for the right shin might define its bounds as: 7, 11, 39, 90. In this example, (7, 11) are the coordinates of the top left corner and (39, 90) are the coordinates of the bottom right corner. Nonetheless, other techniques for defining a bounding box could be used.

The development of simplified image atlas 400 and definitions file 402 typically begins by designing the full avatar (or more generally, the full object), as with a standard image atlas, but each part of it that will appear in the simplified image atlas is designed in an isolated layer to allow the parts to later be separately manipulated and stored. The parts can then be decomposed into the image atlas, with each part being assigned bounds as shown in FIG. 4A.

Figure 4B:
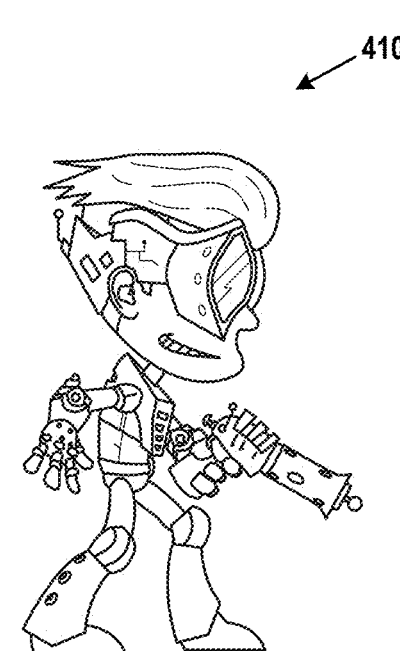

A full avatar 410 is shown in FIG. 4B. Avatar 410 can represent both the full avatar as drawn prior to breaking it into parts to be represented in simplified image atlas 400 and definitions file 402, as well as one of many possible poses of the avatar after it is constructed from simplified image atlas 400 and definitions file 402. Thus, the parts in simplified image atlas 400 can be programmatically assembled by the animation software to create one or more poses of avatar 410. Notably, some avatar parts are omitted from simplified image atlas 400 for purposes of conciseness.

In order to facilitate animation from a simplified image atlas that does not explicit specify all possible poses, the avatar 410, simplified image atlas 400, and/or definitions file 402 may be loaded into animation software. The animation software may be configured to take this input and interactively or automatically create a skeleton for avatar 400. The skeleton may consist of virtual bones being added to each part of the image, with the bones being connected between parts using joints.

For example, avatar 410 could have bones respectively added to the parts corresponding to the avatar's left thigh, left shin, and left foot (here the left thigh and left foot are shown in avatar 410 but omitted from image atlas 400 and definitions file 402 for purposes of simplicity). Avatar 410 may also have joints added connecting the left thigh to the left shin and the left shin to the left foot. The bones can then be assigned a hierarchy such that movement of the higher priority bones will affect the lower priority bones. Thus, the left thigh may have a higher priority than the left shin, which may, in turn, have a higher priority than the left foot. Thus, moving the left thigh may responsively move the left shin and left foot, but moving the left foot does not cause motion in the left shin or left thigh. The bones can be added to each layered part using, for example, a graphical drawing/editing tools or through programming.

Once a full skeleton is assembled from the bones representing each part of avatar 410, that skeleton can be used for any simplified image atlas that represents an object with a similar shape and the number of parts. For example, a humanoid alien could be broken down into simplified image atlas with similar parts to that of the human of avatar 410. The alien's simplified image atlas could then be mapped to the existing skeleton by updating one or both of the labels (if new labels names are used) or the bounds (if the parts of the new object are located at different coordinates in the new simplified image atlas) of the parts.

As noted, avatar 410 represents the fully assembled object. Definitions file 412 specifies one way of how the simplified image atlas can be programmatically assembled into the complete object. Notably, definitions file 412 includes metadata defining hierarchical specifications of bones and their rotations relative to their next-highest priority bones. Definitions file 412 may be a complete file, part of a file, or entries in a database for example. For purposes of simplicity, definitions file 412 only references a few parts of the avatar. A full definitions file may reference more avatar parts and their metadata, respectively.

Once the skeleton is defined, the animation software may allow manipulation of the bones to create movement. This is typically done using keyframes, where the positions, rotations, and scaling of bones at certain points in time are specified. The animation software interpolates the transformations between these keyframes to produce smooth movements. For example, to animate a walking motion, keyframes may be defined for the leg bones at various stages of a step cycle, and the animation software interpolates frames in between the keyframes. A rendering engine of the animation software may update the positions of the parts based on the current state of the skeleton. When a bone moves or rotates, the animation software calculates the new positions and orientations of the attached parts and redraws them accordingly. This allows for complex and fluid animations, as the movement of the avatar's parts is governed by the underlying skeletal structure and does not require explicit definitions of each frame representing the avatar's unique movements.

Furthermore, advanced techniques such as inverse kinematics (IK) can be used to enhance the realism of the animations. IK allows specification of the end position of a limb, and the animation software automatically calculates the necessary rotations and positions of the intermediate bones to achieve that pose, making the animation process more intuitive and efficient.

While the use of a simplified image atlas allows for more efficient animation procedures than the use of a detailed image atlas with objects for each frame of the animation, there are still many inefficiencies that the simplified image atlas carries with it. For example, even a simple palette swap to change colors of the avatar may necessitate reworking each part of the avatar piece by piece and generating a new image atlas. In another example, creating a new image atlas that is compatible with an existing skeleton requires extensive testing to make sure each part fits onto the skeleton and animates appropriately. Furthermore, to save work when creating a new simplified image atlas, each part must share a label and/or be located at the same bounds that was used by the reference simplified image atlas from which the skeleton was built. Otherwise, the new simplified image atlas must be updated with new labels and bounds for each part even though the parts will be placed in equivalent sections of the skeleton.

The embodiments herein overcome these limitations by employing image generation models to produce new avatars and/or avatar parts that conform to pre-defined skeletal structures and/or sizes. These new avatars may be of the same general size and arrangement of an existing avatar but represent a different character to animate. For example, if the avatar is space-themed like avatar 410, the new avatar could be cowboy-themed, pirate-themed, fantasy-themed, etc. Further, an existing avatar like avatar 410 can be reskinned (e.g., changing its visual appearance or texture while keeping the underlying skeleton and animations intact) with new colors, clothing, adornments, and so on by using the image generation model to generate a new avatar and/or a new simplified image atlas for the reskinning. In order to appreciate these technical improvements, a brief diversion into image generation models is provided below.

III. Example Image Generation Models

Various embodiments herein relating to image generation may employ different types of image generation models. These models may be based, at least to some extent, on machine learning and/or generative artificial intelligence (AI). But other types of models may be used.

A. Diffusion Models

Diffusion models are a class of probabilistic generative AI models that transform data by simulating a diffusion process. They can be used for tasks like image generation and de-noising, but are also applicable to audio, text, and time series data. Relevant to the embodiments herein, diffusion models generate image data through a two-phase approach:

a forward diffusion process that adds noise to an input image, and a reverse de-noising process that removes the noise to construct a new image.

Initially, a diffusion model may receive the input image and a command. The command may be a textual prompt or some other form of instruction that informs the model as to how it should generate the new image. In cases where the command is a textual prompt, it may be provided to a text encoder that converts the text into a vector embedding. This embedding captures the semantic content of the text. Examples of such text encoders include a pre-trained transformer model such as one that employs contrastive language-image pre-training (CLIP). Other forms of commands may encompass a set of parameters that guide the image generation process.

The diffusion model may then condition the input image and command. This may involve extracting features from the input image and concatenating these features with a vector representation of the command. Additional steps may include using attention layers in the context of one or more neural networks to focus the diffusion model on relevant portions of the image and the command.

As noted, the forward diffusion process iteratively adds noise to the input image until the input image resembles a predefined noise distribution, typically a standard Gaussian distribution. Doing so trains the diffusion model to be able to predict the noise that was added at each step, thus enabling it to progressively refine noisy data back into clean data during the reverse de-noising process. This allows the model to gains insights into the underlying distribution of pixel values that make up the input image, allowing it to generate new images with new pixel values that resemble the original distribution.

The reverse de-noising process can take the input image, possibly treated with noise, or a modified latent representation thereof. Generation of the new image progressively refines the noisy image into a coherent image in accordance with the command. Thus, these progressive steps may involve the diffusion model using the current noisy image, the text embedding, and potentially features of the input image to predict and remove the noise incrementally. A neural network may predict the noise to be removed at each step, effectively generating the new image such that it is in line with the command while retaining aspects of the input image. Some implementations may perform additional processing of the new image, such as upscaling to a higher resolution, artifact removal, color correction, sharpening, inpainting, and/or edge refinement.

The underlying technology enabling diffusion models may include deep learning frameworks, such as TensorFlow and PyTorch that provide tools and libraries to implement and train these models. The training involves minimizing a loss function that measures the difference between the predicted noise and the actual noise added during the forward diffusion process. Once trained, the model can generate new data by starting with a sample from the noise distribution and iteratively applying the learned reverse diffusion steps. This iterative refinement process, enabled by neural network architectures and optimization techniques, allows diffusion models to produce high-quality new images that are photorealistic or cartoonish, for example.

Users may interface with diffusion models through various platforms and tools. These models are typically encapsulated within user-friendly interfaces, such as web applications, APIs, and software libraries, which allow users to leverage their image generation capabilities. For instance, users might interact with a diffusion model through an online platform where they can input specific parameters or prompts to generate desired images. These platforms could offer sliders, text boxes, and other input fields to customize aspects like style, resolution, or content of the generated images.

B. Large Language Models

The embodiments herein may also employ large language models (LLMs) to perform certain tasks. Doing so is advantageous because these models have capabilities that surpass previous techniques in the fields of natural language understanding, natural language generation, knowledge aggregation, information retrieval, pattern recognition, image generation, and data analysis. Notably, diffusion models may be integrated with LLMs so that the advanced natural language processing (NLP) capabilities of LLMs can be combined with the image generation capabilities of natural language models.

An LLM is an advanced computational model, primarily functioning within the domain of NLP and machine learning. An LLM can be configured to understand, interpret, generate, and respond to human language in a manner that is both contextually relevant and syntactically coherent. The underlying structure of an LLM is typically based on a neural network architecture, more specifically, a variant of the transformer model. Transformers are notable for their ability to process sequential data, such as text, with high efficiency.

The operation of an LLM involves layers of interconnected processing units, known as neurons, which collectively form a deep neural network. This network can be trained on vast datasets comprising text from diverse sources, thereby enabling the LLM to learn a wide array of language patterns, structures, and colloquial nuances for prose, poetry, and program code. The training process involves adjusting the weights of the connections between neurons using algorithms such as backpropagation, in conjunction with optimization techniques like stochastic gradient descent, to minimize the difference between the LLM's output and expected output.

An aspect of an LLM's functionality is its use of attention mechanisms, particularly self-attention, within the transformer architecture. These mechanisms allow the model to weigh the importance of different parts of the input text differently, enabling it to focus on relevant aspects of the data when generating responses or analyzing language. The self-attention mechanism facilitates the model's ability to generate contextually relevant and coherent text by understanding the relationships and dependencies between words or tokens in a sentence (or longer parts of texts), regardless of their position.

Upon receiving an input, such as a text query or a prompt, the LLM may process this input through its multiple layers, generating a probabilistic model of the language therein. It predicts the likelihood of each word or token that might follow the given input, based on the patterns it has learned during its training. The model then generates an output, which could be a continuation of the input text, an answer to a query, or other relevant textual content, by selecting words or tokens that have the highest probability of being contextually appropriate.

Furthermore, an LLM can be fine-tuned after its initial training for specific applications or tasks. This fine-tuning process involves additional training (e.g., with reinforcement from humans), usually on a smaller, task-specific dataset, which allows the model to adapt its responses to suit particular use cases more accurately. This adaptability makes LLMs highly versatile and applicable in various domains, including, but not limited to, chatbot development, content creation, language translation, and sentiment analysis.

Some LLMs are multimodal in that they can receive prompts in formats other than text and can produce outputs in formats other than text. Thus, while LLMs are predominantly designed for understanding and generating textual data, multimodal LLMs extend this functionality to include multiple data modalities, such as visual and auditory inputs, in addition to text. For example, a generative text-to-image model (e.g., a diffusion model) is a subset of LLM that can generate images (and possible accompanying text) from textual and/or image-based prompts.

A multimodal LLM can employ an advanced neural network architecture, often a variant of the transformer model that is specifically adapted to process and fuse data from different sources. This architecture integrates specialized mechanisms, such as convolutional neural networks for visual data and recurrent neural networks for audio processing, allowing the model to effectively process each modality before synthesizing a unified output.

The training of a multimodal LLM involves multimodal datasets, enabling the model to learn not only language patterns but also the correlations and interactions between different types of data. This cross-modal training results in multimodal LLMs being adept at tasks that require an understanding of complex relationships across multiple data forms, a capability that text-only LLMs do not possess. This makes multimodal LLMs particularly suited for advanced applications that necessitate a holistic understanding of multimodal information, such as chatbots that can interpret and produce images and/or audio.

C. Non-AI Image Generation and Manipulation

In some cases, non-AI techniques may be used to generate or manipulate an input image. Thus, the discussion of image generation models herein may include any such technique. For example, the task of reskinning an avatar might involve altering the surface textures, colors, or patterns making up parts of the avatar, or even adding new visual elements to the avatar like clothing, accessories, or facial features. This can be done while maintaining the avatar's underlying 2D or 3D model and structure.

For example, the avatar model may be decomposed into 2D surfaces, known as UV maps, which represent the horizontal and vertical coordinates of discrete areas of the avatar. Such a map can be used as a guide to design new textures or skins. Textures can include colors, patterns, images, and other visual elements.

Once a new texture is selected or designed, it is applied to a UV map. In the case of a 3D avatar, the UV maps are then applied to the avatar's 3D model, adhering to its contours and maintaining the integrity of its structure. By using these tools and techniques, the appearance of the avatar can be significantly altered to create a fresh look or adapt to different themes. This can be done without the need for AI techniques, but AI may be used in one way or another to enhance any of these processes.

IV. Efficient Avatar Design with Image Generation Models

The embodiments herein utilize image generation models, for example, to improve efficiency when generating new avatars. In particular, many applications employ multiple avatars of approximately the same size and having similar features. Also, as noted above, these applications may facilitate the reskinning of existing avatars with new color schemes, clothing, and/or accessories. In other words, generative text-to-image models can be used to generate new avatars that are similar in size and appearance to existing avatars. Further, given such a generated avatar, a reverse transformation (e.g., an inversion) of the generated avatar can be performed to decompose the generated avatar into its constituent parts. Then, the avatar parts can be arranged into an image atlas to facilitate subsequent animation of the generated avatar.

Figure 4C:
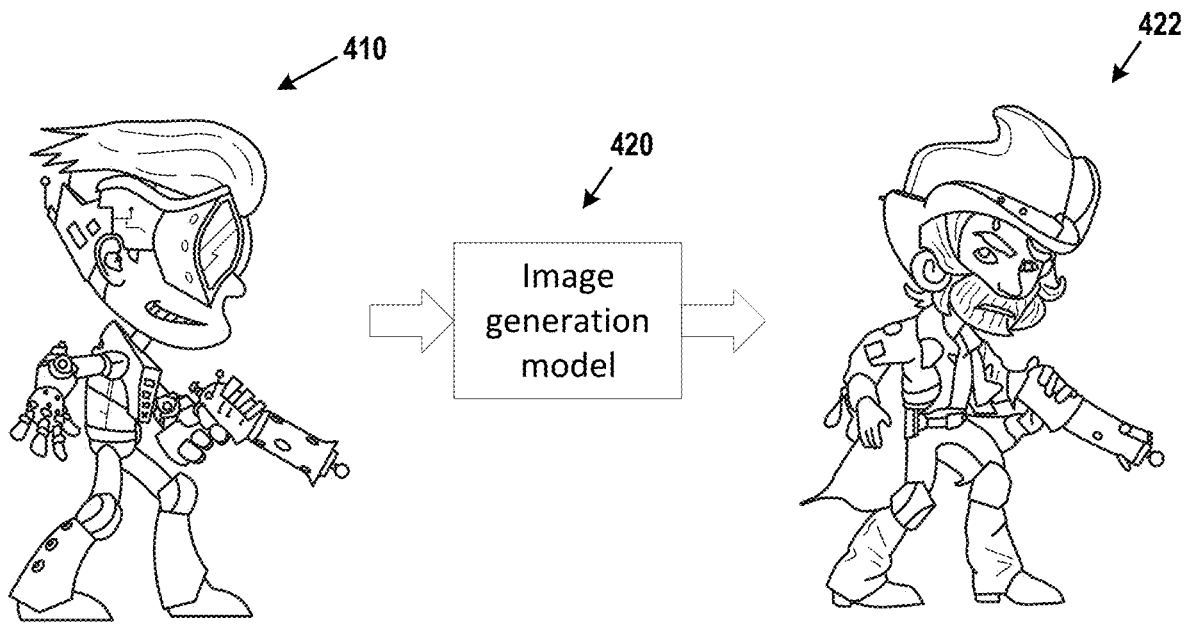
FIGS. 4C and 4D depict an animation framework being used to create an image atlas, in accordance with example embodiments.

FIG. 4C shows processing of avatar 410 by an image generation model 420 to generate a new avatar 422 with a similar size, shape, and pose as that of the original avatar. Image generation model 420 may be a diffusion model as described above, either standalone or integrated into an LLM, for example. In some cases, image generation model 420 may be a non-generative model, such as a neural network specifically trained to transform images of one type of avatar into other types of avatars.

Alternatively, image generation model 420 could include a non-generative aspect that uses a metadata-based description of the new image (e.g., describing the main subject of the image, its structure, and/or main features and their locations). This metadata could be used to determine where features and content based on the input image are placed in the new image, given that these features and content are generated using, e.g., a diffusion model or any other technique described herein.

Image generation model 420 may be given an image (e.g., a JPEG or PNG file) of avatar 410 and a command that causes it to create avatar 422 based on avatar 410. This command may be a simple or complex set of one or more instructions that specifies the desired output. In some cases, the command may take the form of a prompt (e.g., a prompt for a diffusion model or LLM).

For purposes of example, such a prompt may be "Convert this image of a space boy into a cowboy with the exact same pose and style," or "Take the following image of a space boy and convert it into a cowboy of about the same size, silhouette and arrangement as that of the space boy." The content of the prompt may be different based on the abilities and training of image generation model 420. In some cases, image generation model 420 may require a prompt with more detailed instructions such as "Convert this cartoon image of a space boy into a cartoon image of a cowboy. The cowboy should retain the same pose and silhouette as the space boy. Dress the cowboy in traditional Western attire: a brown cowboy hat with a wide brim, a tan leather jacket over a plaid shirt, a belt with a silver buckle, blue jeans, and brown cowboy boots. Give the cowboy dark hair and a beard."

Figure 4D:
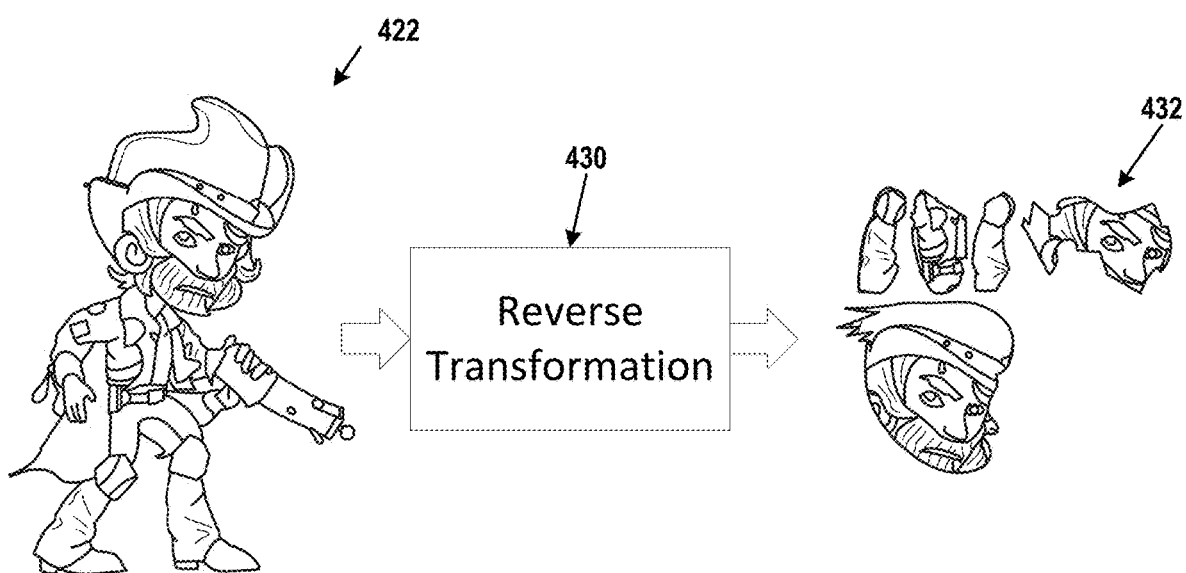

FIG. 4D shows how generated avatar 422 could then be programmatically disassembled into image atlas 432. This can be done by recognizing that the original image atlas 400 is mapped onto a skeleton of avatar 410 using a set of transformations to create animation for avatar 410. Thus, the process can be reverse mapped using a reverse transformation 430 (e.g., an inversion) to turn a generated avatar into its constituent parts for placement in an image atlas.

The transformations may include deterministic reversible operations. For example, suppose that the transformations for avatar parts of simplified image atlas 400 to the avatar 410 were defined by the equation $X = a\pi R$. In this equation, X is the location of the avatar parts on the avatar, R is the location of the avatar part in an image atlas, a is the transformation that translates the avatar part from R and places the avatar part at X, and $\pi$ is a known constant.

As an example, a may be a vector that defines: (i) a horizontal and vertical translation of a predetermined pixel of the avatar part to the location X, (ii) a rotation (e.g., 0-360 degrees) of the avatar part around a z-dimension axis also defined by a predetermined pixel in the avatar part, and/or (iii) a scaling factor that multiplicatively increases or decreases the size of the avatar part. For example, a scaling factor less than 1 causes the avatar part to shrink proportionally and a scaling factor greater than 1 causes the avatar part to expand proportionally (e.g., a scaling factor of 2 causes the avatar part to double in size in each of the x and y dimensions, resulting in the scaled avatar part being 4 times its original area). In full generality, any of the values in the vector for a may be omitted or set to an identity value (e.g., a rotation of 0 degrees means that there is no rotation of the avatar part, and a scaling factor of 1 means that there is no scaling). But other sizes of vectors or non-vector values of a may be used. Moreover, the constant $\pi$ can be set to 1 or omitted when it is not needed.

In one scenario, where simplified image atlas 400 is programmatically mapped to the avatar 410, R could be the bounds found in definition file 402. For example if the animation software were attempting to map the right shin of simplified image atlas 400, then R could be a vector (7, 11, 32, 79) based on data ("bounds: 7, 11, 32, 79") within definition file 402. Thus, X would be the coordinates on the avatar where a predetermined pixel of the right shin avatar part can be found after being transformed by the equation X=a$\pi$R, along with any rotation and/or scaling. Other possible values of R, and/or sources of R, could be used for the purposes of determining X.

Similarly, if X was the known value and R was unknown then the inverse equation R=X/a$\pi$ would define where within the image atlas at which the part located at X on the avatar should be found. Thus, it should be possible to derive the location (R) of a part in simplified image atlas 400 based on the location of that part (X) on the avatar 410.

Using image generation model 420 as noted above, a new avatar 422 can be created with the same or similar size, shape, and/or pose as the original avatar 410. Furthermore, because the original avatar 410 was programmatically assembled from simplified image atlas 400, it means that $X_{0<i<n}$ was calculated as $a_i\pi R_i$ for all n unique avatar parts located within simplified image atlas 400. For simplified image atlas 400, n=5 as there are only 5 avatar parts, however n could be larger depending on the number of avatar parts stored within a given image atlas.

Traditionally, this new avatar 422 would have been constructed from an image atlas 432 using the inefficient techniques described above. Image atlas 432 would then be transformed into avatar 422 using an equation such as:

$$X_{i-cowboy} = a_{i-cowboy}\pi R_{i-cowboy}$$

However, when image generation model 420 is used to generate new avatar 422, new avatar 422 has no corresponding image atlas. Nonetheless new avatar 422 is at least commensurate in size and shape as original avatar 410 and features the same or a similar pose.

Being "commensurate" in size means that new avatar 422 can be the same size as original avatar 410 (e.g., in terms of number of pixels at a particular resolution) or deviate by no more than, for example, 10%, 20%, or 30% from the size as original avatar 410. Being "commensurate" in shape means that new avatar 422 can be the same shape as original avatar

410 or deviate by no more than, for example, 10%, 20%, or 30% from the size as original avatar 410 (e.g., if decomposed into respective sets of contour points, the sum of distances between the corresponding contour points of new avatar 422 and original avatar 410 is less than a threshold value or percentage). In some cases, new avatar 422 may be adorned with different clothing and/or accessories that causes its shape to deviate from that of original avatar 410 in various ways, but not so much that animation sequences of original avatar 410 cannot be used or adapted for animation of new avatar 422.

A similar pose means that new avatar 422 can be in the same pose as original avatar 410 or deviate from this pose. In the latter case, the pose of new avatar 422 might be that of a further frame in an animation sequence (e.g., a candidate next frame), and could be determined using a combination of linear interpolation from the pose of the original avatar and/or IK taking into account avatar joint constraints and avoiding collisions. Other possibilities exist.

In general, less deviation in size, shape, and pose between original avatar 410 and new avatar 422 is preferable because (as described below) it allows for a more direct adaptation of new avatar 422 based on original avatar 410. Nonetheless, the embodiments herein can be applied even when such deviation is present. The amount of deviation that is acceptable may vary based on the sizes, shapes, and poses being considered.

These correspondences mean that if the two avatars were to be arranged so as to overlap with one another, the position of each avatar part of original avatar 410 would be in the same or a similar location as any corresponding avatar part that would be found in a hypothetical image atlas 432. In other words, $X_i=X_{i-cowboy}$, where $X_i$ is the location in simplified image atlas 400 of the ith avatar part of avatar 410 and $X_{i-cowboy}$ is the location in image atlas 432 of the ith avatar part of new avatar 422. Thus, all $X_i$ should match one-to-one with $X_{i-cowboy}$ for corresponding avatar parts of each avatar. For example, if $X_{right-shin}$ means the location of the right shin as described by definitions file 402 after being acted on by the equation $X_{right-shin}=a_{right-shin}\pi R_{right-shin}$, then $X_{right-shin}=X_{right-shin-cowboy}$.

Using these equations, a new image atlas 432 that is functionally identical or similar to image atlas 400 could be created. For example:

$$X_{right-shin-cowboy} = a_{right-shin}\pi R_{right-shin}$$

$$X_{right-shin-cowboy} = a_{right-shin-cowboy}\pi R_{right-shin-Cowboy}$$

For a corresponding image atlas. Solving both of these equations for R produces the following equality:

$$R_{right-shin-cowboy} = \frac{x_{right-shin-cowboy}}{a_{right-shin-cowboy}\pi} = \frac{x_{right-shin-cowboy}}{a_{right-shin}\pi} = R_{right-shin}$$

Which can be simplified as:

$$R_{right-shin-cowboy} = \frac{1}{a_{right-shin-cowboy}} = \frac{1}{a_{right-shin}} = R_{right-shin}$$

Thus, by using the same transformation @right-shin, new avatar 422 can be mapped to a new image atlas 432, wherein each avatar part (e.g. right shin, torso, etc.) of the new image atlas 432 is at a location ($R_{l-cowboy}$) that mirrors the original location ($R_{right\ shin}$) in image atlas 400, and be compatible with the existing bounding boxes as described in definition file 402. New image atlas 432 should also be compatible with any existing skeletons or keyframes made using image atlas 400. This method saves a significant amount of time as a new avatar or avatar skin can be generated without having to design an image atlas for it from the ground up.

Once new image atlas 432 is constructed, any imperfections can be later corrected to account for avatar parts that may be obscured in one frame but not in another. For example the left shin of the cowboy as found in new image atlas 432 may be obscured in different frames of a walking animation. Thus, if new avatar 422 were generated using a frame in which this part of the body was obscured, the additional detail could be added after the fact. Further, corrections can be made to remove any additional details that could cause choppy, stuttering, or jerky movement when using the existing animation with the new avatar. This process, though, is still faster and more efficient than having to generate an entirely new image atlas and check compatibility with the existing skeleton and keyframes.

Thus, even if some corrections may be warranted, the overall efficiency of the animation process is improved by reducing the amount of time required to design and animate a new avatar. Further, computing resources are saved by these animations requiring less debugging and rework.

V. Example Image Generation Interface

As noted above, diffusion models and LLMs can determine the semantic content and/or interpret the semantic meaning of textual or image-based input, and generate text and/or image content as a result. Thus, an image generation model 420 could be used to perform some or all of the functionality described in the context of FIG. 4C. However, naively attempting to use diffusion models or LLMs in this manner (e.g., where they have been trained as foundational models with only general-purpose knowledge) might not produce the desired outcomes.

For example, a general-purpose LLM may have been designed to perform a wide range of language and image understanding and generation tasks across various domains without specialization. It may have been trained on a diverse and broad dataset covering multiple fields, topics, and types of language use as well as various types of image content. This makes general-purpose LLMs versatile and capable of handling a wide array of tasks, but they may not produce domain-specific results with the desired proficiency, accuracy, and nuance. Therefore, it may be desirable to employ a "wrapper" around such an LLM so that the image generation as described herein may be performed more accurately and robustly. A similar wrapper around a diffusion model could be advantageous.

Figure 5:
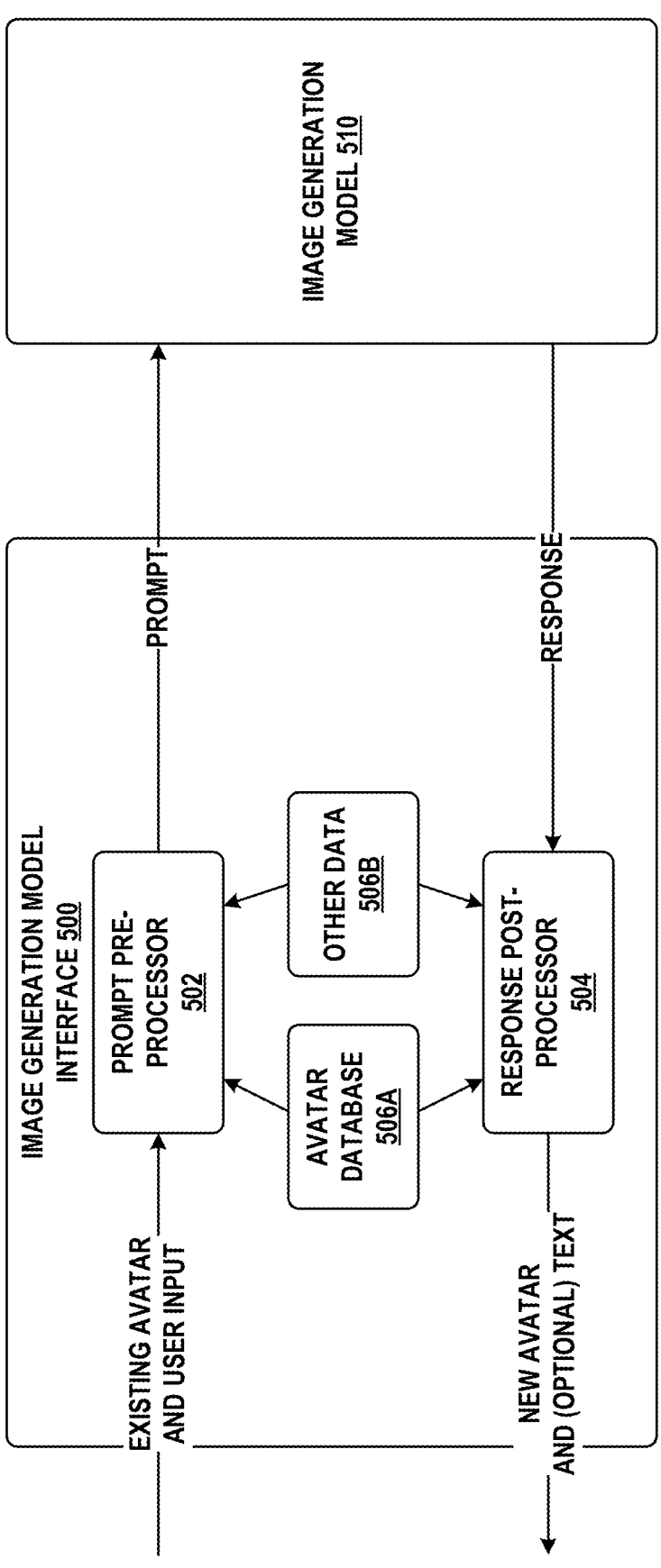
FIG. 5 depicts an example image generation model interface, in accordance with example embodiments.

FIG. 5 depicts such an architecture. Image generation model interface 500 may include prompt pre-processor 502, response post-processor 504, avatar database 506A and/or other data 506B. Additional features of image generation model interface 500 may be present. Avatar definitions 506A and/or other data 506B may influence the operation of prompt pre-processor 502 and response post-processor 504. Examples of content that may be stored for each of these items is discussed below.

Avatar definitions 506A may include examples of one or more avatars such as avatar 410. These avatars may be represented as image files or in another form and may include each avatar taking on one or more poses. In some cases, the avatars may be respectively accompanied by definition files (e.g., like definitions file 412). Additionally or alternatively, each avatar might be tagged or associated with metadata that describes the form and or character of the avatar. For example, there may be multiple instances of images for a humanoid avatar of a particular size, shape, and pose. Each of these instances may be an example of the avatar with a different theme (e.g., space, cowboy, pirate, barbarian, etc.) and/or with a different skin (e.g., color scheme, clothing, accessories, etc.). The metadata associated with these avatars may textually describe the avatar with one or more keywords, alphanumeric tags, or natural language descriptors. For example, the image file of an avatar might be associated with metadata describing the avatar's theme (e.g., pirate), size (in pixels), and pose (mid-stride walking). Other possibilities exist.

Other data 506B may be any type of data that might not be included in avatar database 506A. This could include, for example, customized metadata or other information relating to a user's settings, profile, preferences, and/or text for enhancing commands (e.g., prompts).

As noted, image generation model interface 500 serves as a "wrapper" around image generation model 510 (here, image generation model 510 may be a diffusion model, LLM, or non-AI model). In other words, a representation (e.g., an image) of an existing avatar, as well as user input, may be received by prompt pre-processor 502. Prompt pre-processor 502 may generate a prompt from the existing avatar and user input as well as information from one or more of avatar database 506A and/or other data 506B.

Prompt pre-processor 502 may transmit the prompt to image generation model 510. In turn, image generation model 510 may perform NLP and/or image generation tasks to determine a response to the prompt. This response may contain an image of a new avatar based on the existing avatar in accordance with the user input.

Using one of the examples from above, the existing avatar may be in an image file of avatar 410 and the user input may be "Take the following image of a space boy and convert it into a cowboy of about the same size, silhouette, and arrangement as that of the space boy." In response to receiving this image file and user input, prompt pre-processor 502 may query avatar database 506A (e.g., by searching metadata of the avatar images therein) for examples of avatar images of other space-themed and pirate-themed humanoids. If this query results in one or more avatar images, these images and their associated metadata may be used in conjunction with image file of avatar 410 and the user input to create the prompt.

For instance, suppose that the query to avatar database 506A results in a corresponding pair of space-themed and pirate-themed avatar images in which the avatars are of the same or similar sizes and poses. Then, a textual portion of the prompt might be "Take the following image of a space boy and convert it into a cowboy of about the same size, silhouette, and arrangement as that of the space boy. Here is an example of an image of a space-themed avatar and a corresponding cowboy-themed avatar to be used to guide generation of the cowboy." The prompt may also include the image file of avatar 410 as well as one or more files containing the corresponding pair of space-themed and pirate-themed avatar images.

As noted, the response may include an attempt by image generation model 510 to generate an image of a new avatar that is similar to that of image file of the existing avatar provided to prompt pre-processor 502, in accordance with instructions of the user input. In some cases, the response may include more than one such generated image.

Image generation model 510 may provide the response to image generation model interface 500, which routes it to response post-processor 504. Response post-processor 504 may modify, edit, and/or select words, tokens, or other items from the response and provide it along with the new avatar. Response post-processor 504 may resize, downsample, reorient, or otherwise manipulate the image file of the new avatar according to predetermined settings. Alternatively or additionally, response post-processor 504 may add optional text to the response, for example to describe aspects of the new avatar. In cases where image generation model 510 provides more than one generated image for the new avatar, response post-processor 504 may provide these images and corresponding text describing each.

Notably, image generation model interface 500 may operate on a client device (e.g., a desktop computer, laptop computer, smartphone, or tablet operated by a user who provides the existing avatar and user input). Alternatively, image generation model interface 500 may operate on a server device. Image generation model 510 may be disposed on such a server device or within a remote cloud-based network accessible to the server device.

In some cases, image generation model 510 may be trained or fine-tuned with data from avatar database 506A. Thus, image generation model 510 may be able to learn, from examples of corresponding avatars of different themes or skins, how an existing exists with a particular theme or skin can be used to generate a new avatar that has a different theme or skin, but also has the same or similar size, shape, and pose. This may allow the arrangement of image generation model interface 500 to be omitted and its functionality subsumed into image generation model 510.

Moreover, in some cases, a domain-specific image generation model may be used instead of a general-purpose image generation model. A domain-specific image generation model may be tailored to understand, generate, and interpret image and/or language and images with one or more specific themes. These models are trained on datasets that are rich in examples of such images as well as related terminology, jargon, and stylistic nuances specific to their target domain. This focused training approach allows them to achieve higher accuracy and relevancy in tasks within their area of specialization, as they can better grasp the context and subtleties of domain-specific images and language. Execution of these domain-specific image generation models may require less computational resources (e.g., processor and/or memory utilization) than general-purpose image generation models.

VI. Example Operations

FIG. 6 is a flow chart illustrating an example embodiment. The process illustrated by FIG. 6 may be carried out by a computing device, such as computing device 100, and/or a cluster of computing devices, such as server cluster 200. However, the process can be carried out by other types of devices or device subsystems. For example, the process could be carried out by a portable computer, such as a laptop, a tablet device, or any combination of devices in accordance with (but not limited by) FIGS. 1 and 2.

The embodiments of FIG. 6 may be simplified by the removal of any one or more of the features shown therein. Further, these embodiments may be combined with features, aspects, and/or implementations of any of the previous figures or otherwise described herein.

Block 600 may involve obtaining a plurality of invertible mappings between pixel locations of first avatar parts for a first avatar and pixel locations of the first avatar parts represented as individual images in non-overlapping regions of a first image atlas, wherein the first avatar can be graphically animated by an animation engine based on the first image atlas and the invertible mappings.

Block 602 may involve, based on the first avatar and a command, obtaining a second avatar that is commensurate in shape and size to that of the first avatar. In some cases, the command can be omitted as it is assumed or implicit, or the command can be replaced by a simple alphanumeric or binary command. In other cases, the command may include a natural language command, such as a text formed into a coherent sentence. Alternatively or additionally, the command may include a set of one or more instructions that specifies the desired output.

Block 604 may involve, based on inverting the invertible mappings, determining a second image atlas for the second avatar, wherein non-overlapping regions of the second image atlas contain second avatar parts for the second avatar represented as individual images, and wherein the second avatar can be animated by the animation engine based on the second image atlas and the invertible mappings.

Some implementations may involve animating, by the animation engine, the second avatar, wherein the animation engine applies the plurality of invertible mappings to the second image atlas based on an animation sequence for the first avatar.

In some implementations, the second avatar is in a common pose as that of the first avatar.

In some implementations, the first avatar is in a first pose, wherein the second avatar is in a second pose derived from the first pose.

In some implementations, the invertible mappings comprise linear translations of horizontal and vertical coordinates of the first avatar parts.

In some implementations, the invertible mappings comprise rotation for at least some of the first avatar parts.

In some implementations, the invertible mappings associate at least some of the first avatar parts to joints of an animation skeleton of the first avatar.

In some implementations, the second avatar comprises a reskinned version of the first avatar.

In some implementations, the first avatar parts and the second avatar parts comprise limbs, clothing, or accessories.

In some implementations, the first avatar is a two-dimensional representation of a first object, and the second avatar is a two-dimensional representation of a second object.

In some implementations, the non-overlapping regions respectively comprise two-dimensional bounding boxes that define quadrilaterals.

In some implementations, obtaining the second avatar further comprises: providing, to image generation model, an image representation of the first avatar and the command, wherein the image representation of the first avatar comprises a frame of an animation of the first avatar; and receiving, from the image generation model, an image representation of the second avatar. The image generation model may be a diffusion model, an LLM, or a non-AI model, for example.

VII. Example Technical Improvements

These embodiments provide a technical solution to a technical problem. One technical problem being solved is the use of generative AI to produce images of new avatars that are similar in one or more ways to that of existing avatars. In practice, this solution is advantageous because the new avatars can be decomposed into avatar parts based on an invertible mapping between pixel locations of avatar parts in existing avatar and these parts in an image atlas for the existing avatar.

Previous techniques were not equipped to generate new avatars at all, instead requiring the new avatars and their associated image atlases to be developed from the ground up. Doing so resulted significant usage of computational resources (e.g., processor, memory, and/or network capacity) not only during the design and drawing of the new avatars, but also during testing thereof. Each new avatar would need to be unit tested, integration tested, performance tested, and even beta tested by users to ensure that their animations are smooth, natural, and properly interacting with the appropriate virtual environments.

The embodiments herein overcome these limitations by employing image generation and/or natural language models to generate images of a new avatar of the same or similar size, shape, and pose of the existing avatar. Then any invertible transformations between parts of the new avatar and its corresponding image atlas can be reused to animate the new avatar. This results in several advantages. First, computational resources are no longer wasted in avatar design procedures. Second, the new avatars need little if any custom animation, since they can be animated using the same framework as that of the existing avatar on which they are based. Third, testing procedures for the new avatar can be dramatically reduced because its animation is likely to be of sufficient quality and has already been thoroughly tested for the existing avatar.

Other technical improvements may also flow from these embodiments, and other technical problems may be solved. Thus, this statement of technical improvements is not limiting and instead constitutes examples of advantages that can be realized from the embodiments.

VIII. Additional Embodiments

Implementations of the present disclosure may relate to one or more of the enumerated clauses listed below.

(1) obtaining a plurality of invertible mappings between pixel locations of first avatar parts for a first avatar and pixel locations of the first avatar parts represented as individual images in non-overlapping regions of a first image atlas, wherein the first avatar can be graphically animated by an animation engine based on the first image atlas and the invertible mappings; based on the first avatar and a command, obtaining a second avatar that is commensurate in shape and size to that of the first avatar; and based on inverting the invertible mappings, determining a second image atlas for the second avatar, wherein non-overlapping regions of the second image atlas contain second avatar parts for the second avatar represented as individual images, and wherein the second avatar can be animated by the animation engine based on the second image atlas and the invertible mappings.

(2) The computer-implemented method any previous clause, further comprising: animating, by the animation engine, the second avatar, wherein the animation engine applies the plurality of invertible mappings to the second image atlas based on an animation sequence for the first avatar.

(3) The computer-implemented method any previous clause, wherein the second avatar is in a common pose as that of the first avatar.

(4) The computer-implemented method any previous clause, wherein the first avatar is in a first pose, and wherein the second avatar is in a second pose derived from the first pose.

(5) The computer-implemented method any previous clause, wherein the invertible mappings comprise linear translations of horizontal and vertical coordinates of the first avatar parts.

(6) The computer-implemented method any previous clause, wherein the invertible mappings comprise rotation for at least some of the first avatar parts.

(7) The computer-implemented method any previous clause, wherein the invertible mappings associate at least some of the first avatar parts to joints of an animation skeleton of the first avatar.

(8) The computer-implemented method any previous clause, wherein the second avatar comprises a reskinned version of the first avatar.

(9) The computer-implemented method any previous clause, wherein the first avatar parts and the second avatar parts comprise limbs, clothing, or accessories.

(10) The computer-implemented method any previous clause, wherein the first avatar is a two-dimensional representation of a first object, and the second avatar is a two-dimensional representation of a second object.

(11) The computer-implemented method any previous clause, wherein the non-overlapping regions respectively comprise two-dimensional bounding boxes that define quadrilaterals.

(12) The computer-implemented method any previous clause, wherein obtaining the second avatar further comprises: providing, to an image generation model, an image representation of the first avatar and the command, wherein the image representation of the first avatar comprises a frame of an animation of the first avatar; and receiving, from the image generation model, an image representation of the second avatar.

IX. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
obtaining a plurality of invertible mappings between pixel locations of first avatar parts for a first avatar and pixel locations of the first avatar parts represented as individual images in non-overlapping regions of a first image atlas, wherein the first avatar can be graphically animated by an animation engine based on the first image atlas and the invertible mappings;
based on the first avatar and a command, obtaining a second avatar that is commensurate in shape and size to that of the first avatar; and
based on inverting the invertible mappings, determining a second image atlas for the second avatar, wherein non-overlapping regions of the second image atlas contain second avatar parts for the second avatar represented as individual images, and wherein the second avatar can be animated by the animation engine based on the second image atlas and the invertible mappings.

2. The computer-implemented method of claim 1, further comprising:
animating, by the animation engine, the second avatar, wherein the animation engine applies the plurality of invertible mappings to the second image atlas based on an animation sequence for the first avatar.

3. The computer-implemented method of claim 1, wherein the second avatar is in a common pose as that of the first avatar.

4. The computer-implemented method of claim 1, wherein the first avatar is in a first pose, and wherein the second avatar is in a second pose derived from the first pose.

5. The computer-implemented method of claim 1, wherein the invertible mappings comprise linear translations of horizontal and vertical coordinates of the first avatar parts.

6. The computer-implemented method of claim 1, wherein the invertible mappings comprise rotation for at least some of the first avatar parts.

7. The computer-implemented method of claim 1, wherein the invertible mappings associate at least some of the first avatar parts to joints of an animation skeleton of the first avatar.

8. The computer-implemented method of claim 1, wherein the second avatar comprises a reskinned version of the first avatar.

9. The computer-implemented method of claim 1, wherein the first avatar parts and the second avatar parts comprise limbs, clothing, or accessories.

10. The computer-implemented method of claim 1, wherein the first avatar is a two-dimensional representation of a first object, and the second avatar is a two-dimensional representation of a second object.

11. The computer-implemented method of claim 1, wherein the non-overlapping regions respectively comprise two-dimensional bounding boxes that define quadrilaterals.

12. The computer-implemented method of claim 1, wherein obtaining the second avatar further comprises:
providing, to an image generation model, an image representation of the first avatar and the command, wherein the image representation of the first avatar comprises a frame of an animation of the first avatar; and
receiving, from the image generation model, an image representation of the second avatar.

13. A non-transitory computer-readable medium storing program instructions that, when executed by one or more processors of a computing system, cause the computing system to perform operations comprising:
obtaining a plurality of invertible mappings between pixel locations of first avatar parts for a first avatar and pixel locations of the first avatar parts represented as individual images in non-overlapping regions of a first image atlas, wherein the first avatar can be graphically animated by an animation engine based on the first image atlas and the invertible mappings;

based on the first avatar and a command, obtaining a second avatar that is commensurate in shape and size to that of the first avatar; and based on inverting the invertible mappings, determining a second image atlas for the second avatar, wherein non-overlapping regions of the second image atlas contain second avatar parts for the second avatar represented as individual images, and wherein the second avatar can be animated by the animation engine based on the second image atlas and the invertible mappings.

14. The non-transitory computer-readable medium of claim 13, the operations further comprising:

animating, by the animation engine, the second avatar, wherein the animation engine applies the plurality of invertible mappings to the second image atlas based on an animation sequence for the first avatar.

15. The non-transitory computer-readable medium of claim 13, wherein the first avatar is in a first pose, and wherein the second avatar is in a second pose derived from the first pose.

16. The non-transitory computer-readable medium of claim 13, wherein the invertible mappings comprise linear translations of horizontal and vertical coordinates of the first avatar parts.

17. The non-transitory computer-readable medium of claim 13, wherein the invertible mappings comprise rotation for at least some of the first avatar parts.

18. The non-transitory computer-readable medium of claim 13, wherein the invertible mappings associate at least some of the first avatar parts to joints of an animation skeleton of the first avatar.

19. The non-transitory computer-readable medium of claim 13, wherein the second avatar comprises a reskinned version of the first avatar.

20. A computing system comprising:

one or more processors;

memory; and program instructions, stored in the memory, that upon execution by the one or more processors cause the computing system to perform operations comprising:

obtaining a plurality of invertible mappings between pixel locations of first avatar parts for a first avatar and pixel locations of the first avatar parts represented as individual images in non-overlapping regions of a first image atlas, wherein the first avatar can be graphically animated by an animation engine based on the first image atlas and the invertible mappings;

based on the first avatar and a command, obtaining a second avatar that is commensurate in shape and size to that of the first avatar; and based on inverting the invertible mappings, determining a second image atlas for the second avatar, wherein non-overlapping regions of the second image atlas contain second avatar parts for the second avatar represented as individual images, and wherein the second avatar can be animated by the animation engine based on the second image atlas and the invertible mappings.

* * * * *